(12) United States Patent
Boss et al.

(10) Patent No.: US 6,854,796 B2
(45) Date of Patent: Feb. 15, 2005

(54) ROOF MODULE WITH MOVEABLE LID AND RIGID SEALING STRIP

(75) Inventors: Christoph Boss, Frankfurt am Main (DE); Thorsten Paul, Lorzweiler (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/643,783

(22) Filed: Aug. 19, 2003

(65) Prior Publication Data

US 2004/0070234 A1 Apr. 15, 2004

(30) Foreign Application Priority Data

Aug. 20, 2002 (DE) .......................................... 102 38 064

(51) Int. Cl.[7] ................................................ B60J 7/043
(52) U.S. Cl. ............................. 296/216.01; 296/216.08
(58) Field of Search ........................... 296/213, 216.01, 296/216.03, 216.08

(56) References Cited

U.S. PATENT DOCUMENTS

| 4,463,983 A | | 8/1984 | Hellriegel | |
| 4,752,099 A | * | 6/1988 | Roos et al. | .................. 296/223 |
| 5,540,478 A | * | 7/1996 | Schuch | ........................ 296/210 |
| 6,145,911 A | * | 11/2000 | Sturt et al. | ................ 296/65.01 |
| 6,533,349 B2 | * | 3/2003 | Nabuurs | ................ 296/216.08 |

FOREIGN PATENT DOCUMENTS

| DE | 42 27 400 A1 | 2/1994 |
| DE | 29820613 U | 3/2000 |
| DE | 10033887 C | 8/2001 |
| EP | 1 207 068 A1 | 5/2002 |
| EP | 1314600 A | 5/2003 |
| WO | WO 00/29235 A1 | 5/2000 |
| WO | WO 0234558 A | 5/2002 |

OTHER PUBLICATIONS

European Search Report.
Search report, Australian Patent Office, dated Sep. 4, 2002.

* cited by examiner

*Primary Examiner*—Dennis H. Pedder
(74) *Attorney, Agent, or Firm*—Carlson, Gaskey & Olds

(57) ABSTRACT

A roof module includes an outer skin having a slot which receives a holding element for a lid. The lid is movable between a closed position and an open position. The roof module further includes a rigid covering element movable between a closed position in which the covering element closes the slot and an open position in which the covering element clears the slot to allow entry of the holding element of the lid.

17 Claims, 5 Drawing Sheets

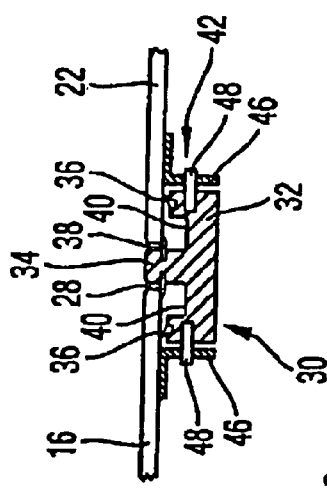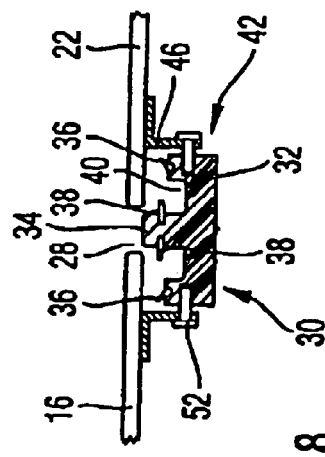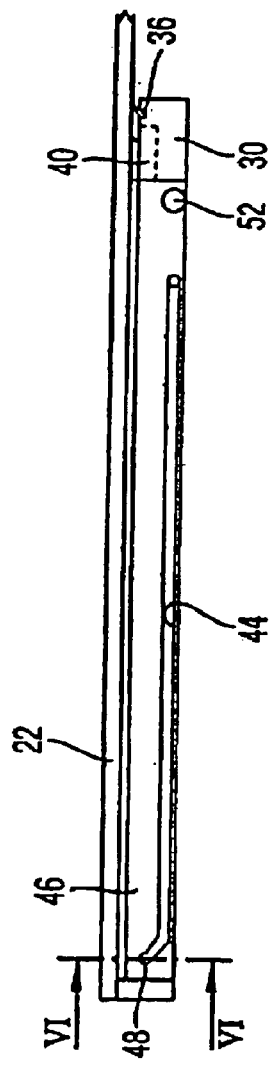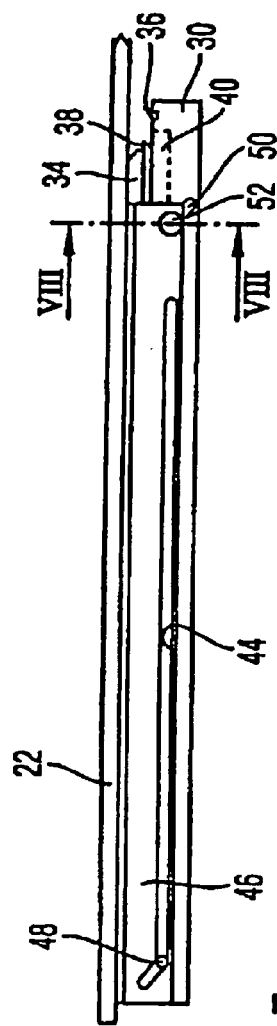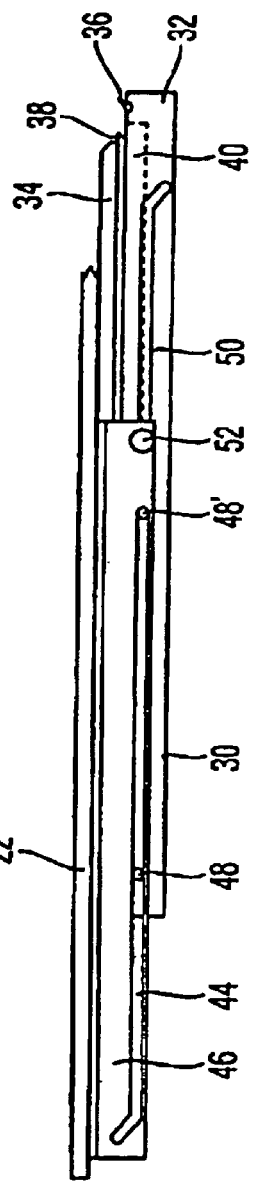

ROOF MODULE WITH MOVEABLE LID AND RIGID SEALING STRIP

This application claims priority to German Patent Applicant Number DE 102 38 064.3 filed on Aug. 20, 2002.

BACKGROUND OF THE INVENTION

This invention relates generally to a roof module including an outer skin having at least one slot that receives a holding element for a lid movable between a closed position and an open position.

A roof module having a lid is disclosed in the German Utility Model 298 20 613. The lid is part of a sliding roof system. In the open position, the lid clears a roof opening in the roof module and lies on the outside of the roof module in the manner of a spoiler.

The lid is connected to a holding element movable in a guide rail of the roof module to ensure stable guidance of the lid. The holding element is connected to the front edge of the lid as seen in direction of travel and the rear edge of the lid. To ensure that the lid can be moved sufficiently to the rear and completely clear the roof opening, despite the fact that the holding element is provided at the rear edge of the lid, the roof module includes a slot that can receive the holding element. An elastically deformable seal is provided to seal the slot and to prevent excessive wind noise, strong ingress of water, and soiling. The seal is mounted at the lateral edge of the slot and is locally urged to the side by the holding element when the holding element enters into the slot.

A disadvantage of the known construction is that the flexible seal does not completely cover the slot and is not completely flush. Additionally, it is difficult to adapt the color of the seal to the color of the roof module. This can be a drawback if there are high quality requirements on the visual appearance of the seal. The object of the invention consists in developing a roof module as mentioned above to the effect that even the high optical appearance requirements can be satisfied.

SUMMARY OF THE INVENTION

The roof module of the present invention includes a rigid covering element movable between a closed position where the covering element closes a slot and an open position where the covering element clears the slot to allow entry of a holding element of the lid. The rigid covering element can terminate flush with the edges of the slot. The covering element can be adapted to the contour of the outer skin and can also extend in a three-dimensionally curved form. The covering element is dimensionally stable, and the precision of the termination with the edges of the slot is also maintained over a long period of operation and is not subjected to wear.

Preferably, in the open position, the covering element is disposed below the outer skin by a connecting link guide mounted below the outer skin. The covering element is movable in the connecting link guide. This allows the covering element to be easily moved under the outer skin where the covering element neither disturbs the visual appearance of the roof module nor causes wind noise, for example.

Preferably, the covering element includes a body and a strip protruding from the body which engages in the slot. The broader body provides two drip rails to collect and discharge water in a controlled way.

Two seals can be mounted at the body for sealing. The seals rest against the outer skin when the covering element is in the closed position. Additionally, two seals are preferably mounted at the strip and rest against the outer skin when the covering element is in the closed position. Any water that penetrates to the inside between the strip and the outer skin, despite the seals, is collected by the drip rail. The seal between the body and the outer skin prevents water from advancing further into the interior of the roof module.

The covering element can be made of any suitable material having a low weight and that provides the desired high dimensional stability, such as metal or plastic. Therefore, the covering element can easily be painted. If the covering element is made of plastic, it can also be dyed.

When the lid is moved into the open position and the holding element enters into the slot, the holding element engages a contact surface of the covering element to move the covering element from the closed position into the open position. In this case, a spring is preferably provided to urge the covering element into the closed position. When closing the lid, the covering element follows the holding element and automatically returns to the closed position. Alternately, a coupling formation can be provided at the covering element which can be engaged by a carrier, to move the covering element. In this case, the covering element is directly retracted from the holding element and back into the closed position.

These and other features of the present invention will be best understood from the following specification and drawings.

BRIEF DESCRIPTION OF THE DRAWINGS

The invention will subsequently be described with reference to a preferred embodiment which is represented in the attached drawings, in which:

FIG. 5 shows a schematic side view of the region shown in FIG. 4 with the covering element in the closed position;

FIG. 6 shows a section along the plane VI—VI of FIG. 5;

FIG. 7 shows a view corresponding to the view of FIG. 5 with the covering element in a slightly open condition;

FIG. 8 shows a section along the plane VIII—VIII of FIG. 7; and

FIG. 9 shows a view corresponding to the view of FIG. 7 with the covering element in a more open position.

DETAILED DESCRIPTION OF THE PREFERRED EMBODIMENT

Figure 1:
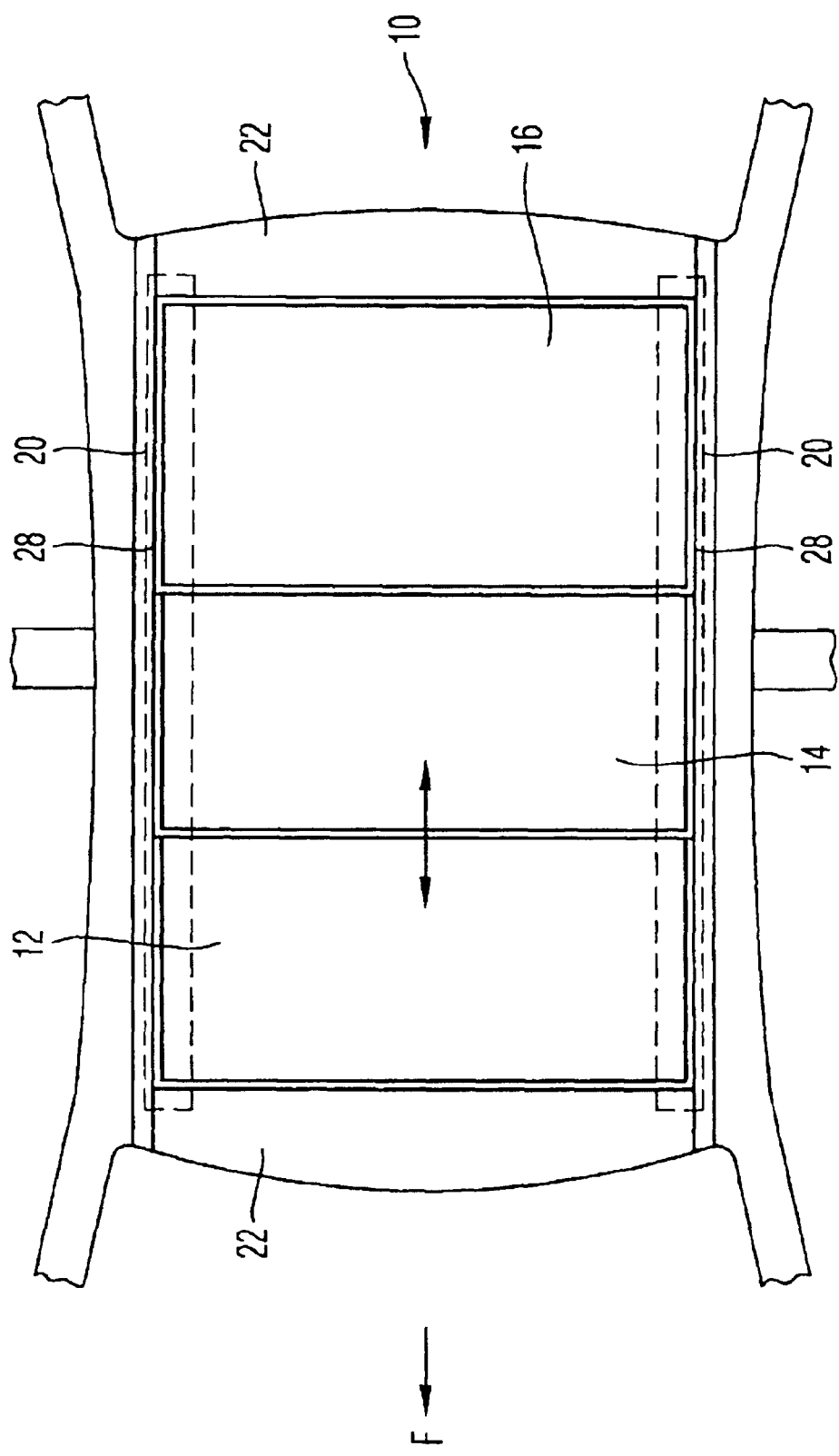
FIG. 1 shows a schematic top view of a roof module in accordance with the invention having two lids in the closed position.
Figure 2:
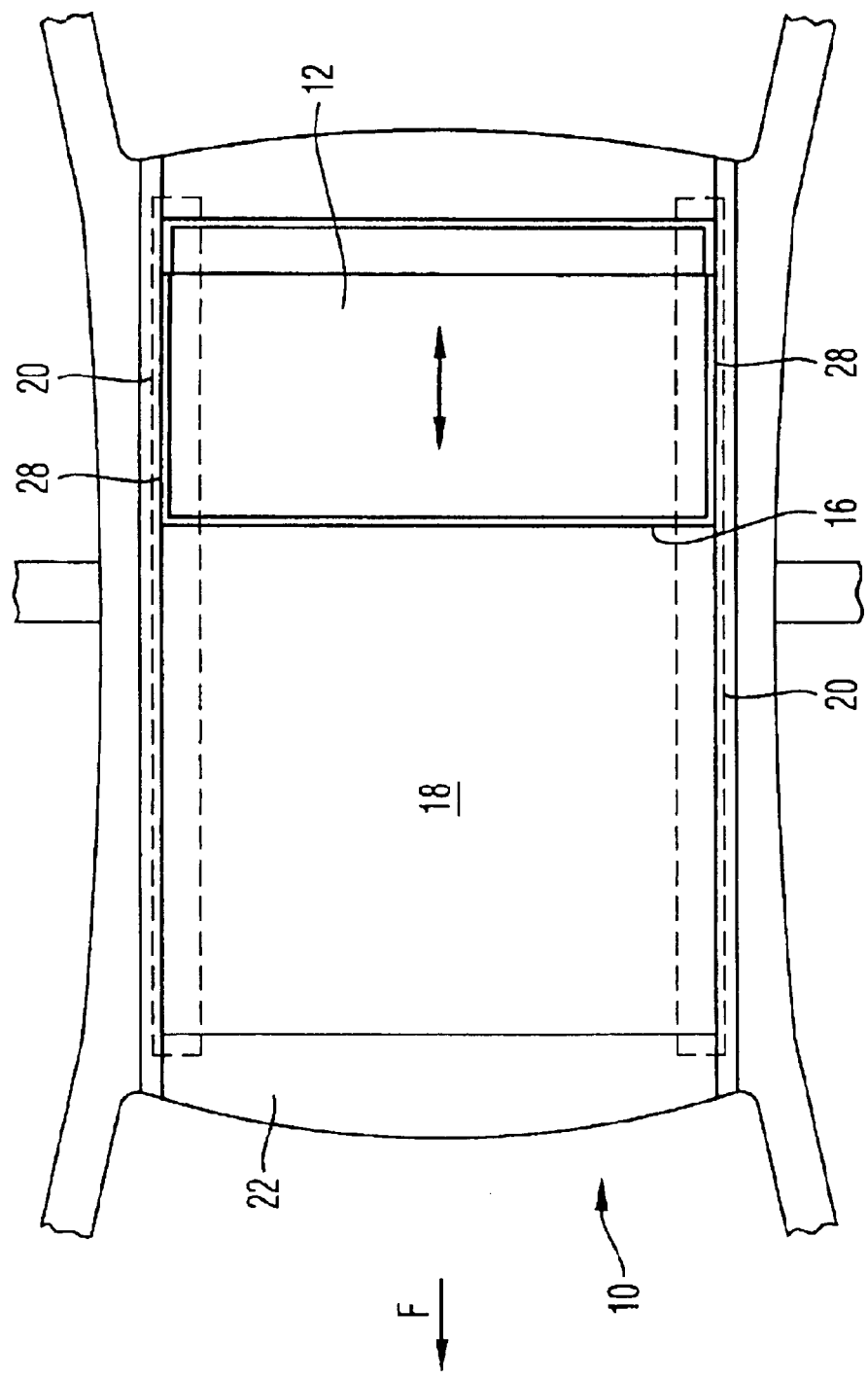
FIG. 2 shows the roof module of FIG. 1, with the two lids in the open position.
Figure 3:
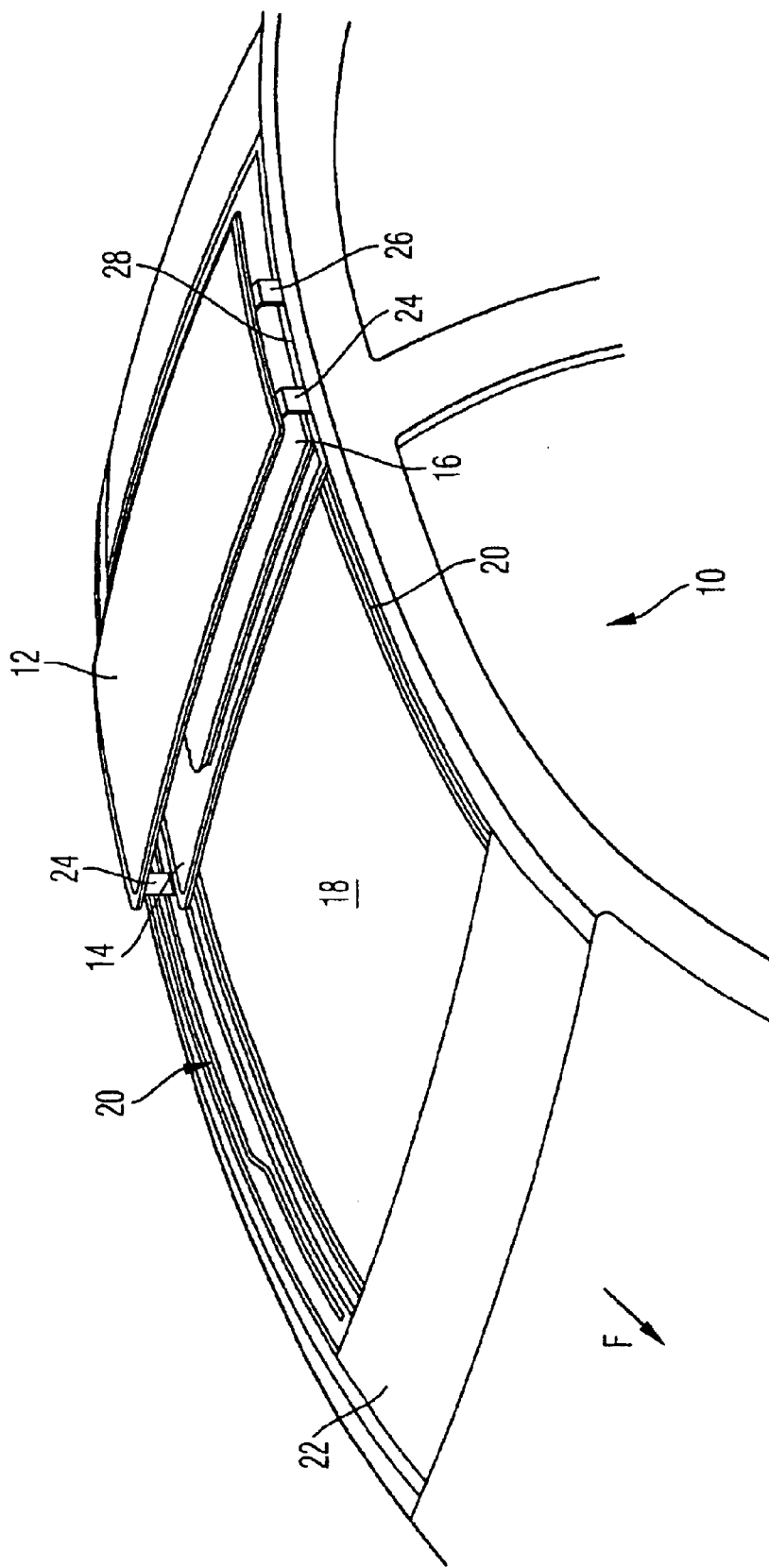
FIG. 3 shows a perspective view of the roof module of FIG. 2.

FIG. 1 shows a roof module 10 having a first lid 12, a second lid 14, and a stationary roof element 16. The first and second lids 12 and 14 are moveable between a closed position (as shown in FIG. 1) where the lids 12 and 14 close a roof opening 18 of the vehicle, and an open position (as shown in FIGS. 2 and 3), where the lids 12 and 14 clear the roof opening 18. In the open position, the second lid 14 lies below the stationary roof element 16 and the first lid 12 lies above the stationary roof element 16.

The roof module 10 includes two guide rails 20 that allow movement of the first lid 12 and the second lid 14. The guide rails 20 are disposed below the surface defined by an outer skin 22 of the roof module 10, i.e. by the stationary outer surfaces of the roof module 10. Various holding elements mounted on the two lids 12 and 14 are moveably accommodated in the guide rails 20. Only the front holding elements 24 and the rear holding elements 26 of the first lid 12 are shown (see FIG. 3). The exact structure of the guide rails 20, as well as the way of adjusting the holding elements for the two lids 12 and 14 in the guide rail 20, are not relevant for the understanding of the invention.

Two slots 28 are provided in the outer skin 22 of the roof module 10 and along the lateral edges of the stationary roof element 16. The two front holding elements 24 and the two rear holding elements 26 can enter into the slots 28 when the first lid 12 is moved rearwardly into the open position in which the lid 12 is located above the stationary roof element 16.

Figure 4:
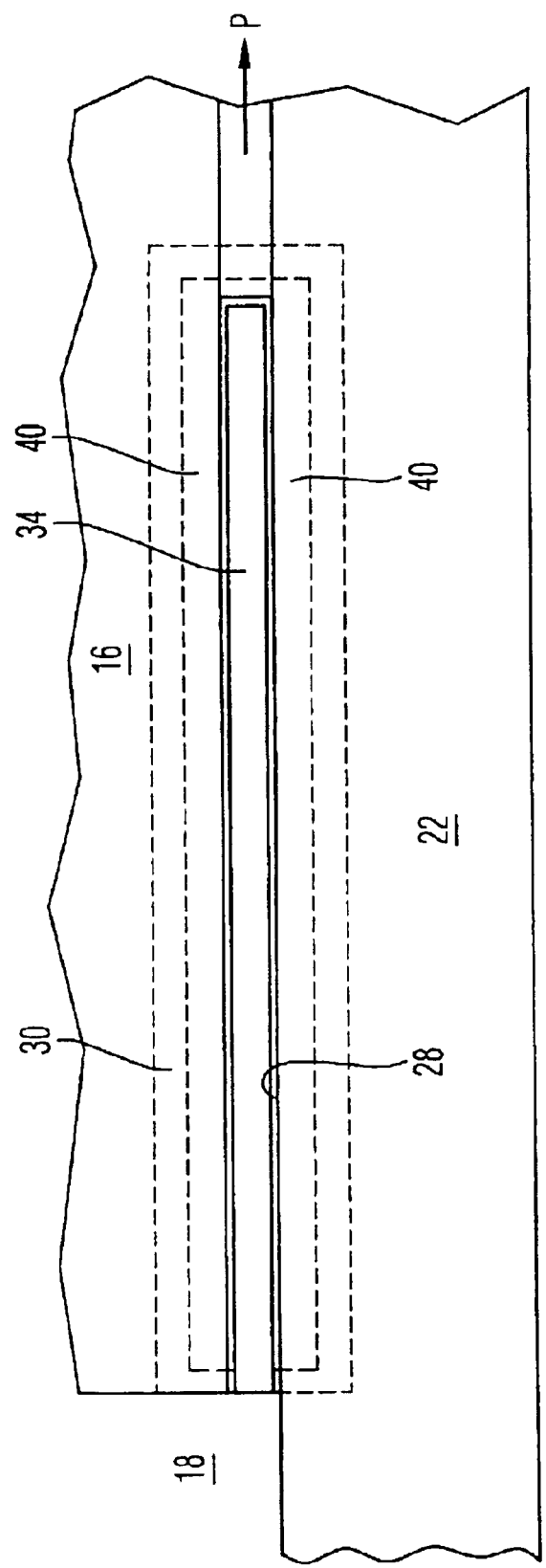
FIG. 4 shows an enlarged schematic top view of the region IV of FIG. 1.

FIG. 4 shows a slot 28 proceeding from the roof opening 18 and located between the stationary roof element 16 and the portion of the outer skin 22 disposed laterally of the stationary roof element 16. The slot 28 extends as far to the rear as required for the rear holding element 26 to move the first lid 12 to the open position.

The roof module 10 further includes a covering element 30 (also shown in FIG. 6) including a body 32 having a generally rectangular cross-section and a strip 34 having a rectangular cross-section that centrally protrudes upwards from the body 32. The covering element 30 is movably mounted below the outer skin 22 or the stationary roof element 16. The covering element 30 is moveable between a closed position shown in FIGS. 5 and 6, in which the strip 34 engages in the slot 28 and terminates flush with the outer skin 22 on the outside of the roof module 10 and an open position in which the covering element 30 is moved to the rear, in the direction of the arrow P of FIG. 4, and under the outer skin 22.

The covering element 30 can be made of any suitable material having a low weight and that provides the desired high dimensional stability, such as metal (FIG. 6) or plastic (FIG. 8). Therefore, the covering element 30 can easily be painted. If the covering element 30 is made of plastics, it can also be dyed.

Two seals 36 are mounted on the body 32 of the covering element 30 and another two seals 38 are mounted laterally on the strip 34. Alternately, each seal can be a circumferential seal. The seals 36 and 38 rest against the bottom surface of the outer skin 22 when the covering element 30 is in the closed position. Two drip rails 40 are provided around the strip 34 in which water can collect and, despite the seals 36, enter through the slot 28 into the space between the outer skin 22 and the covering element 30. Alternately, a single circumferential drip rail can be utilized. An outlet (not shown) can also be provided to discharge collected water in a controlled way.

The covering element 30 is movably mounted below the outer skin 22 by two connecting link guides 42. Each connecting link guide 42 includes a first connecting link 44 in each of two mounting angles 46. The two mounting angles 46 are mounted on both sides of the covering element 30 and on the bottom surface of the outer skin 22. A first connecting link bolt 48 firmly mounted in the covering element 30 engages each of the two first two connecting links 44.

The connecting link guide 42 also includes two second connecting links 50 formed in the vertical side walls of the body 32 of the covering element 30. A second connecting link bolt 52 is firmly accommodated in the corresponding mounting angle 46 and engages in each of the second connecting links 50. Both the first connecting link 44 and the second connecting link 50 have an inclined portion in the region which engages the corresponding connecting link bolt 48 and 52 when the covering element 30 is in the closed position. Therefore, when the covering element 30 is adjusted from the closed position to the rear in the direction of the arrow P, as shown in FIGS. 7 and 8, the covering element 30 is first adjusted to the rear and downwards at an angle below the plane of the outer skin 22 and then under the plane of the outer skin 22.

FIG. 9 shows the covering element 30 moved to the rear by about half the maximum possible distance. The covering element 30 can be moved until the first connecting link bolt 48 reaches the end of the first connecting link 44 in the position 48' as shown in FIG. 9. In this completely open position, the slot 28 is completely cleared, allowing the two holding elements 24, 26 to freely enter into the slot 28.

The covering element 30 can be moved from the closed position into the open position such that the rear holding element 26 or a carriage connected therewith, which is accommodated in the guide rail, rests against a contact surface of the covering element 30 and moves the covering element 30 directly to the rear. Preferably, a spring (not shown) urges the covering element 30 into the closed position, ensuring that the covering element 30 automatically returns to its closed position when the rear holding element 26 leaves the slot 28. Alternately, a carrier coupled to the covering element 30 may be provided at the rear holding element 26 to pull the covering element 30 both to the rear into the open position and to the front into the closed position.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A roof module comprising:
   an outer skin having a slot;
   a lid moveable between a closed position and an open position;
   at least one holding element for said lid receivable in said slot; and
   a covering element movable between a closed position in which said covering element is received in said slot and an open position in which said covering element is removed from said slot to allow said at least one holding element to access said slot.

2. The roof module as claimed in claim 1, wherein said covering element is below said outer skin when said covering element is in said open position.

3. The roof module as claimed in claim 1, wherein said covering element is movable in a connecting link guide mounted below said outer skin.

4. The roof module as claimed in claim 1, wherein said covering element includes a body and a strip protruding from said body that engages said slot.

5. The roof module as claimed in claim 4, wherein said body includes at least one drip rail.

6. The roof module as claimed in claim 4, further including at least one seal mounted on said body of said covering element, and said at least one seal rests against said outer skin when said covering element is in said closed position.

7. The roof module as claimed in claim 4, further including at least one seal mounted on said strip, wherein said at least one seal rests against said outer skin when said covering element is in said closed position.

8. The roof module as claimed in claim 1, wherein said covering element is made of metal.

9. The roof module as claimed in claim 1, wherein said covering element is made of plastic.

10. The roof module as claimed in claim 1, wherein a color of said covering element matches a color of said roof module.

11. The roof module as claimed in claim 1, wherein said covering element includes a contact surface engagable by said at least one holding element to move said covering element from said closed position into said open position.

12. The roof module as claimed in claim 4 further including at least one seal mounted on said strip of said covering element, wherein said at least one seal rests against said outer skin when said covering element is in said closed position.

13. The roof module as claimed in claim 1, further including at least two connecting link guides, wherein said covering element is moveably mounted to the roof module by said at least two connecting link guides.

14. The roof module as claimed in claim 13, wherein each of said at least two connecting link guides include:
    a mounting angle mounted on said covering element and said outer skin; and
    a first connecting link bolt mounted in said covering element and a first connecting link in said mounting angle, wherein said first connecting link bolt engages said first connecting link.

15. The roof module as claimed in claim 14, wherein each of said at least two connecting link guides further include a second connecting link bolt mounted in said mounting angle and a second connecting link in said covering element, wherein said second connecting link bolt engages said second connecting link.

16. The roof module as claimed in claim 1 wherein said covering element is rigid.

17. A method for opening a lid of a roof module comprising the steps of:
    providing an outer skin having a slot, at least one holding element for the lid that is receivable in said slot, and a covering element received in said slot;
    moving said lid from a closed position to an open position;
    removing said covering element from said slot; and
    sliding said at least one holding element for said lid in said slot.

* * * * *